3,245,469
WELL TREATING PROCESS AND FLUID COMPOSITION FOR HIGH TEMPERATURE WELLS
Theodore A. Bertness, Whittier, Calif., assignor to Socony Mobil Oil Company, Inc., a corporation of New York
No Drawing. Filed Mar. 14, 1963, Ser. No. 265,042
15 Claims. (Cl. 166—39)

This invention relates to fluids for use in wells. More particularly, it relates to fluids for use in wells subject to high temperatures.

In the recovery of petroleum from subterranean formations, the formations are often subjected to procedures which produce excessively high temperatures within the formations. The temperatures attained as a results of these recovery procedures are in excess of the geothermal temperatures normally encountered. For example, the formations may be heated to raise their temperature, thereby increasing the recovery of petroleum. In one procedure for increasing the recovery of petroleum from formation by heating, a part of the petroleum within the formations is subjected to in situ combustion. In this procedure, termed in situ combustion, the temperature within the formations can be of the order of 500° F. Many times it is much higher. Other means for heating the formations can also be used. For example, the formations may be heated by the action of hot air, water, steam, radiant heat, or hot flue gases.

Operations such as drilling, completing, and reworking of wells which penetrate formations at such excessively high temperatures are dangerous and difficult. Particular problems arise from the use of conventional drilling fluids in such well operations because of the deleterious effects on the drilling fluids of the high temperatures. Drilling fluids provide a variety of necessary functions. One function is to provide a hydrostatic head upon subterranean formations penetrated by the well to prevent the escape of high pressure formation fluids. Drilling fluids ordinarily must contain substantial amounts of inorganic or inert solids, especially clays, in order to provide the desired functions. Loss of any of the liquid from the drilling fluid into a permeable formation results in a mud or wall cake being formed upon the face of the formation surrounding the well. The mud or wall cake becomes "fired" by the high temperatures within the formation and forms a hard ceramic mass. The ceramic mass is especially hard, and nonporous, where large amounts of clay are present as inert mud solids. This ceramic mass formed by firing the inert mud cake is usually of low permeability so that fluid flows between the well and surrounding formations are greatly reduced. Further, the hard ceramic mass becomes difficult, if not impossible, to remove with available methods and tools when it is desired subsequently to place the well into production or to carry out other operations.

Oil emulsion drilling fluids which do not contain large quantities of inert solids, especially clays, are often employed in well operations. These oil emulsion drilling fluids might be suggested for use in wells at excessively high temperatures without encountering the problem created by "firing" of the mud cake. However, these drilling fluids will, as a result of contacting the high temperature formations, return to the surface of the earth at elevated temperatures. As a result of the high temperature and the high oil content, these drilling fluids release, at the earth's surface when exposed to the atmosphere, vapors which are highly explosive, or at least highly inflammable. Also, the oil emulsion drilling fluids usually contain sufficient quantities of inert solids that the possibility of forming the nonpermeable ceramic mass of "fired" mud cake is not remote.

It is an object of this invention to provide a fluid for use in wells subject to high temperatures. It is another object of this invention to avoid the difficulties encountered with fluids for wells containing large quantities of inert solids, especially clays, in operations in a well at high temperature. It is another object of this invention to avoid the dangers of fire or explosion of fluid components in well operations undertaken at high temperatures. It is another object of this invention to provide a fluid for wells that cannot form a nonpermeable ceramic mass of "fired" wall cake at high well temperatures. These and other objects of the invention will become apparent from the following detailed description.

In accordance with the invention, there is provided a fluid for wells comprising water and, as the predominant solid component, a finely divided, combustible bulk material of organic origin. In a more particular aspect, the fluid comprises water, a protective colloidal agent and, as the predominant solid component, a finely divided, combustible bulk material of organic origin.

Water can be the entire liquid component of the fluid. However, other liquids may be present which do not produce ceramic-like solids upon thermal degradation. The water may have the usual contaminates found in natural waters. However, concentrations of any solids-producing contaminants should be sufficiently low that impervious deposits are not produced in the formation to the extent of restricting fluid flow in the well upon loss of liquid from the fluid to the formation. Potable water is preferred as the entire aqueous liquid component of the drilling fluid.

Other liquids may be intermixed with the water to form emulsions or solutions. The water may be the continuous or the dispersed phase. Small amounts of hydrocarbons not exceeding 15 percent by volume of the liquid component of the fluid may be emulsified with the water using emulsifying agents or surfactants. Fluids with such small amounts of hydrocarbons do not usually provide sufficient vapors to be explosive or highly inflammable when heated. Hydrocarbons other than diesel oil can be used. However, more highly volatile hydrocarbons should be avoided because of the greater combustibility of their vapors at high temperatures. Any of the surfactants used in forming emulsion drilling fluids can be used. Usually approximately 0.1 pound per barrel (hereinafter abbreviated p.p.b.) of the surfactant for each 1.0 percent of oil by volume is sufficient although lesser amounts can be effective. For example, the liquid can be comprised of water with 5 percent diesel oil by volume emulsified by .25 p.p.b. of surfactant DME. Amounts greater than 0.1 p.p.b. for each 1.0 percent by volume of oil can also be used, if desired.

The surfactant DME is a trademark of a product which is the adduct of 30 mols of ethylene oxide with nonyl phenol. Other surfactants can also be used, if desired.

The predominant solid component of the fluid is a finely divided, combustible bulk material of organic origin. By finely divided is meant that the major portion of the material is in sizes passing through a 100 mesh screen (U. S. Standard Sieve Series). Preferably, all of the material is in sizes passing through a 100 mesh screen. Furthermore, the material should be about equally divided between sizes passing through 200 and 325 mesh screens for optimum rheological properties of the fluid. The combustible bulk material must decompose to only a small residue, if any, upon being fired at a temperature of 500° F., or higher. The term "organic origin" as applied to the materials is intended to define the materials as being provided by vegetative growth, or products prepared from such vegetative growth, or being synthetic organic materials, and mixtures thereof. These latter products are usually fibrous. Examples of the bulk materials that may be employed are lignite, bark products of the conifers, vegetable shells, cardboard, and mixtures thereof.

Any of the many types of lignite which have properties between peat and coal can be used. A type found most desirable is sold commercially under the trademark Macco-Lignite.

Any of the various bark products of the conifers can be used. A preferred product is Douglas fir bark which usually is prepared by pulverizing the thick bark of the old growth Douglas fir. Typical of finely divided Douglas fir bark found well suited for use in the fluid is the product identified by the trade name Silvacon. Silvacon types 425, 472, and 490 are examples of bulk material with substantially all particles passing through a 100 mesh screen. It is preferable to use Silvacon 490. Reference may be had to United States Patent No. 2,601,050 for more detailed information as to pulverized Douglas fir bark. Other conifer bark products can be used. For example, Redwood bark products, such as are available commercially under the trade name Palcotan can also be used.

Finely divided vegetable shells and materials made from them can also be used. For example, the shells of walnuts ground to a granulated form of the mentioned sizes are usable in this invention. Without shells sold under the trade names Agrashell WF-5X (200 mesh grind) and Agrashell WF-7X (325 mesh grid) are suitable. Other types of vegetable shells, such as almond hulls, can also be used.

Granulated or pulverized cardboard is a desirable bulk material in this invention. By cardboard is meant paper products manufactured from fibrous raw materials. The fibrous raw materials can be chemical wood pulp (particularly sulfate and sulfite), semi-chemical pulp, mechanical pulp, waste paper, and straw fiber. One source of pulverized cardboard is the salvage of discarded paper boxes and cartons. These discarded paper materials may be shredded and processed in a hammer mill to produce a finely divided bulk material. Manufactured cardboard, or the fibrous raw materials themselves, can also be used if desired. In either event, the resulting finely divided cardboard is readily wetted by water to produce a fibrous colloidal suspension in the fluid.

Other types of combustible bulk material of organic origin can be used separately or in mixtures with the bulk materials previously described. However, good results have been obtained using a combustible bulk material selected from the group consisting of lignite, Douglas fir bark, walnut shells, cardboard, and mixtures thereof.

The combustible bulk material should be present in the fluid in an amount not less than 5 p.p.b. of fluid. Lesser amounts of bulk material produce a fluid having less desirable rheological and wall-building properties. Generally, not over 50 p.p.b. of the bulk material can be used in the fluid and yet retain a pumpable fluid. Good results, both as to the rheological and wall-building properties, can be obtained with the fluid containing between 5 and 10 p.p.b. of the bulk material. The rheological and wall-building properties of the fluid are substantially the same as conventional drilling muds containing clays.

Thus, a fluid consisting of water and between 5 and 50 p.p.b. of a finely divided, combustible bulk material of organic origin has been provided without any noncombustible or inert solids. This fluid has the desirable rheological and wall-building properties of conventional clay drilling fluids but will not form the impermeable, hard ceramic mass that is formed by "firing" the wall cake which remains in the well.

In some instances, it may be desirable to reduce the filter loss properties of the fluid. By filter loss is meant the loss of water by filtration from the fluid in a well to the formation, and is defined by the conventional 30-minute A.P.I. fluid loss test procedure. A filter loss in the amount of about 5 cc. or less is preferred. A filter loss in the amount of about 150 cc. can be tolerated in some formations. Generally, acceptable filter loss properties can be obtained in the fluid without a protective colloidal agent. It may be desirable to reduce the filter loss to a very low value in instances where water will tend to react with certain formation materials to reduce permanently the permeability of the formation. Other reasons may also exist. A protective collodial agent can be used in the fluid to produce a desired reduction in filter loss. The usual organic filter loss control agents used in drilling fluids can be used. For example, a protective colloidal agent selected from the group consisting of carboxymethylcellulose and its salts, polyacrylonitrile polymers, starch, and mixtures thereof is usable to reduce the filter loss from the fluids of the present invention.

The sodium carboxymethylcellulose (CMC) is readily obtained from drilling mud product suppliers under the trade name of Driscose.

Many synthetic polymers have been used to reduce filter loss of water containing fluids for walls. Such polymers can be used in the fluids of this invention. It is preferred to use the polyacrylonitrile polymers disclosed in the United States Patent No. 2,718,497. Examples of these water soluble, high molecular weight polyacrylate polymers are the products available commercially under the trade names of Cypan and Kylo. Hereinafter, these polymers will be referred to as polyacrylonitrile polymers. Other synthetic polymers for reducing filter loss can be used, if desired.

Starch is another protective colloidal agent which may be employed. Preferably, a caustic-treated starch is employed. One such starch is available under the trade name Impermex. Other starches may be used, if desired.

The protective colloidal agent is used in an effective amount to produce the desired reduction in filter loss. For example, a fluid comprised of ground cardboard and water having emulsified therein 5 percent of diesel oil by volume with DME as a surfactant was prepared. Cypan was admixed with the fluid in an amount of .25 p.p.b. to produce a resulting fluid having a filter loss in the desired range below 50 cc. Generally, not over 6 p.p.b. of the protective colloidal agent is required in the fluid for a filter loss as low as about 2 cc. In some situations, as little as 0.1 p.p.b. of the protective colloidal agent can be used effectively. Usually, an effective amount of the protective colloidal agent will require adding to the fluid between .25 and 6 p.p.b. of the selected agent. Preferably, the protective colloidal agent is added in an amount between 4 and 6 p.p.b.

In some instances, the rheological and wall-building properties may be improved by the addition of sufficient caustic to provide the fluid with a pH in the range of between about 8.5 and about 9.5. For example, caustic would be employed to improve the stability of colloidal dispersion of lignite in water. Usually, an amount of caustic between .25 and 1.5 p.p.b. of the fluid is required. Sodium hydroxide is a preferred caustic for use in the fluid.

Small amounts of inorganic or inert solids such as formation solids will become included in the fluid. For example, some amount of inert solids may be incorporated in the fluid during a drilling procedure. Preferably, the inert solids should be removed from the fluid. One means to remove them is to centrifuge the fluid. Other means to remove them can be used, if desired. Small amounts of the inert solids may be retained by the fluid with the result that the hardness of a "fired" wall cake will increase while the permeability of such cake will decrease. For this reason, in any event, the ratio of the inert solids to the combustible bulk material in the fluid should not be in excess of the ratio of 1.0 percent by weight of the fluid to each 50 p.p.b. of the bulk material in the fluid. Usually, this will mean that the inert solids should never exceed about 3 p.p.b. of the fluid. The contaminated fluid may be discarded in toto or in part and fresh fluid substituted therefor to maintain the concentration of the inert solids at the desired level.

The process for performing a desired operation in a well using the fluid will now be described. The well will have at least one high temperature area where the fluid of this invention will avoid the problems of forming "fired" ceramic-like wall cakes. The term "high temperature area," as used herein, is an area having a temperature of at least 500° F.

As a first step, a sufficient amount of the fluid is introduced into the well to provide the necessary environment to perform the desired operation. The environment may be to maintain suitable hydrostatic pressure in the well to keep the sidewalls of the formation from collapsing. Also, the fluid may provide an insulative medium about various down-well mechanisms used to carry out the desired operation.

The next step is to circulate the fluid at a rate sufficient to maintain the combustible bulk material below thermal decomposition temperatures. Generally, it is desirable to maintain the temperature of the fluid below 500° F. Preferably, the fluid should not be permitted to exceed 250–300° F. so that any organic filter loss control agent in the fluid is not subjected to accelerated degradation.

The desired operation may be carried out during the fluid circulation step. As an example, the desired operation may be to "work over" thermal recovery wells. Such operation may include replacing thermally deteriorated production liners and other down-well mechanisms. Other types of operations may also be undertaken during the fluid circulation step.

After completion of the desired operation in the well, and prior to returning the well to normal operation, the circulation of the fluid is discontinued. As much of the fluid as is convenient may be removed from the well. A wall cake formed by filter loss of water from the fluid remains along with any fluid left in the well. Upon the termination of the circulation of the fluid, the temperature of the remaining fluid increases, especially at the high temperature area. Ultimately, the temperature increases sufficiently to remove volatile fluids. Also, the combustible bulk material is thermally degraded from organic combustible solids to ashes by the resultant temperature in excess of 500° F. Further, any combustible fluids, such as diesel oil, and any organic fluid loss additives present in the fluid are also destroyed. Thus, the fluid remaining in the well, especially as a wall cake, produce only a small residue. The residue is friable and very highly permeable and porous. By friable is meant the property of being easily crumbled or pulverized. Also, friable may be considered as the oppositive of the properties possessed by a hard ceramic mass which is highly nonpermeable and formed by "firing" a wall cake produced by conventional clay containing drilling fluids. A building brick has the properties of such hard ceramic mass.

The residue of the fluid may be left in the well inasmuch as it will usually not interfere with well operations. However, the residue of the fluid can be readily removed, if desired. One means for removing the residue is by conventional well cleaners for removing an "unfired" mud cake. Examples of such well cleaners are rotatable wire brushes, and reciprocating wire wall scrapers. Other means for removing the residue may be used, if desired.

From the foregoing, there has been provided a fluid, and a process, for use in wells subject to high temperatures. The fluid has the necessary rheological and wall-building properties for use in drilling or reworking wells that conventional clay containing drill fluids possess but without any noncombustible inert solids. These properties include adequate plastic viscosity, yield point, density, filter loss and bridging loss for use in any type of well operation, even in sand formations. The fluid is stable at the temperatures encountered during circulation of the fluid. Upon being thermally decomposed, only a small residue remains which is highly permeable and friable with practically no inert solids content. By this invention, very hot wells may have a desired operation performed in them with the use of a fluid possessing all the advantage of clay-containing drilling fluids without the undesired production of a hard nonpermeable ceramic mass from firing the fluid left in the well, particularly the wall cake.

Various modifications and changes may be made to the heretofore described fluid, and the process, without departing from the intent of this invention, as will be apparent to one skilled in the art. The description of the present invention is to be considered as illustrative and not limitative, with the invention being defined by the following claims.

What is claimed is:
1. A process comprising the steps of:
  (a) introducing a fluid into a well penetrating a subterranean formation at least in part subject to elevated temperatures sufficient to decompose thermally materials of organic origin, said fluid comprising water and a finely divided, combustible bulk material, the bulk material being present in an amount not less than 5 pounds per barrel of fluid,
  (b) circulating the fluid in the well at a rate sufficient to maintain the bulk combustible material below thermal decomposition temperatures, and thereafter
  (c) discontinuing circulating the fluid in the well whereby the temperature of the fluid remaining in the well adjacent the elevated temperature part of said formation is increased sufficiently that the combustible bulk material is thermally decomposed.

2. The process of claim 1 wherein the combustible bulk material is selected from the group consisting of lignite, Douglas fir bark, walnut shells, cardboard, and mixtures thereof, the bulk material being present in an amount between 5 and 50 pounds per barrel of the fluid.

3. A process comprising the steps of:
  (a) introducing a fluid in to a well penetrating a subterranean formation at least in part subject to elevated temperatures sufficient to decompose thermally materials of organic origin, said fluid comprising water, a protective colloidal agent and a finely divided, combustible bulk material, the colloidal agent being present in an effective amount to reduce the fluid loss and the bulk material being present in an amount not less than 5 pounds per barrel of fluid.
  (b) circulating the fluid in the well at a rate sufficient to maintain the bulk combustible material below thermal decomposition temperatures, and thereafter
  (c) discontinuing circulating the fluid in the well whereby the temperature of the fluid remaining in the well adjacent the elevated temperature part of said formation is increased sufficiently that the combustible bulk material is thermally decomposed.

4. The process of claim 3 wherein the protective colloidal agent is selected from the group consisting of carboxymethylcellulose and its salts, polyacrylonitrile polymers, starch, and mixtures thereof, and the colloidal agent is present in an amount between .1 and 6 pounds per barrel of fluid.

5. The process of claim 3 wherein the protective colloidal agent is selected from the group consisting of carboxymethylcellulose and its salts, polyacrylonitrile polymers, starch, and mixtures thereof, the colloidal agent being present in an amount between .1 and 6 pounds per barrel of fluid, and the combustible bulk material is selected from the group consisting of lignite, Douglas fir bark, walnut shells, cardboard, and mixtures thereof, and the bulk material being present in an amount between 5 and 50 pounds per barrel of fluid.

6. The process of claim 5 wherein an alkali metal hydroxide is added to the fluid in an amount to provide a pH in the range of between about 8.5 and about 9.5.

7. The process of claim 6 wherein the alkali metal hydroxide is sodium hydroxide.

8. A fluid thermally decomposable within a well into a small residue of a highly permeable and friable nature, said fluid consisting essentially of:
 (a) water,
 (b) a protective colloidal agent,
 (c) a combustible bulk material of organic origin present in an amount between 5 and 50 pounds per barrel of fluid and said bulk material being finely divided into sizes passing through a 100-mesh screen,
 (d) said protective colloidal agent present in an effective amount to reduce the filter loss from said fluid, and
 (e) the fluid's components containing in admixture a total amount of inert solids not in excess of 3 pounds per barrel of fluid.

9. The fluid of claim 8 wherein the amounts of the combustible bulk material which pass through 200- and 325-mesh screens are about equal.

10. A fluid thermally decomposable within a well into a small residue of a highly permeable and friable nature, said fluid consisting essentially of:
 (a) water,
 (b) a protective colloidal agent selected from the group consisting of carboxymethylcellulose and its salts, polyacrylonitrile polymers, starch, and mixtures thereof, and the protective colloid present in an amount between .1 and 6 pounds per barrel of fluid,
 (c) a combustible bulk material of organic origin in an amount between 5 and 50 pounds per barrel of fluid with said bulk material being finely divided into sizes passing through a 100-mesh screen, and said combustible bulk material selected from the group consisting of lignite, Douglas fir bark, walnut shells, cardboard, and mixtures thereof, and
 (d) the fluid's components containing in admixture a total amount of inert solids not in excess of 3 pounds per barrel of fluid.

11. The fluid of claim 10 wherein the amounts of the combustible bulk material which pass through 200– and 325-mesh screens are about equal.

12. The fluid of claim 10 wherein an alkali metal hydroxide is added to the fluid in an amount to provide a pH in the range between about 8.5 and about 9.5.

13. The fluid of claim 10 wherein the alkali metal hydroxide is sodium hydroxide.

14. A fluid thermally decomposable within a well into a small residue of a highly permeable and friable nature, said fluid consisting essentially of:
 (a) water,
 (b) a combustible bulk material of organic origin in an amount between 5 and 50 pounds per barrel of fluid with said bulk material being finely divided into sizes passing through a 100-mesh screen,
 (c) diesel oil in an amount of between 5 and 15 percent by volume of the water,
 (d) the adduct of 30 mols of ethylene oxide with nonyl phenol as a surfactant in the amount of at least 0.25 pound per barrel of fluid,
 (e) polyacrylonitrile polymer as a protective colloidal agent in the amount of at least 0.25 pound per barrel of fluid, and
 (f) the fluid's components containing in admixture a total amount of inert solids not in excess of 3 pounds per barrel of fluid.

15. The fluid of claim 14 wherein the amounts of the combustible bulk material which pass through 200- and 325-mesh screens are about equal.

References Cited by the Examiner
UNITED STATES PATENTS

| | | | |
|---|---|---|---|
| 2,064,936 | 12/1936 | McQuiston | 166—32 |
| 2,794,779 | 6/1957 | Cardwell | 252—8.55 |
| 2,812,161 | 11/1957 | Mayhew | 166—32 X |
| 2,815,079 | 12/1957 | Goins et al. | 175—72 X |
| 2,896,715 | 6/1959 | Wilburn | 166—32 |
| 2,898,294 | 8/1959 | Priest | 252—8.55 |
| 3,022,248 | 2/1962 | Anderson et al. | 166—42.1 X |
| 3,047,066 | 7/1962 | Mosely | 166—32 |
| 3,082,823 | 3/1963 | Hower | 166—32 X |

FOREIGN PATENTS 803,544  10/1958  Great Britain.

OTHER REFERENCES

Gatlin: Petroleum Engineering Drilling and Well Completions, Prentice Hall, Inc., Englewood Cliffs, N.J., 1960, pages 77 to 83 relied on.

CHARLES E. O'CONNELL, *Primary Examiner.*

BENJAMIN HERSH, *Examiner.*